(No Model.) 2 Sheets—Sheet 1.

P. LYON.

RAILWAY SWITCH.

No. 271,486. Patented Jan. 30, 1883.

Witnesses.
C. J. Smith
R. E. Browne

Inventor.
Philip Lyon
Thos S. Smith
By Chas J. Gooch, attorney
associate attorney (No Model.) 2 Sheets—Sheet 2.

P. LYON.
RAILWAY SWITCH.

No. 271,486. Patented Jan. 30, 1883.

Attest:
C. P. Swett
Chas. J. Gooch

Inventor.
Philip Lyon
By T. L. Smith
atty

UNITED STATES PATENT OFFICE.

PHILIP LYON, OF EAST STROUDSBURG, PENNSYLVANIA.

RAILWAY-SWITCH.

SPECIFICATION forming part of Letters Patent No. 271,486, dated January 30, 1883.

Application filed July 20, 1882. (No model.)

*To all whom it may concern:*

Be it known that I, PHILIP LYON, of East Stroudsburg, in the county of Monroe and State of Pennsylvania, have invented certain new and useful Improvements in Railway-Switches; and I do hereby declare that the following is a full, clear, and exact description of the invention, which will enable others skilled in the art to which it appertains to make and use the same, reference being had to the accompanying drawings, which form a part of this specification.

This invention relates to automatic switches; and it consists in certain improvements in devices for operating the same, as will be hereinafter described and claimed.

Figure 1:
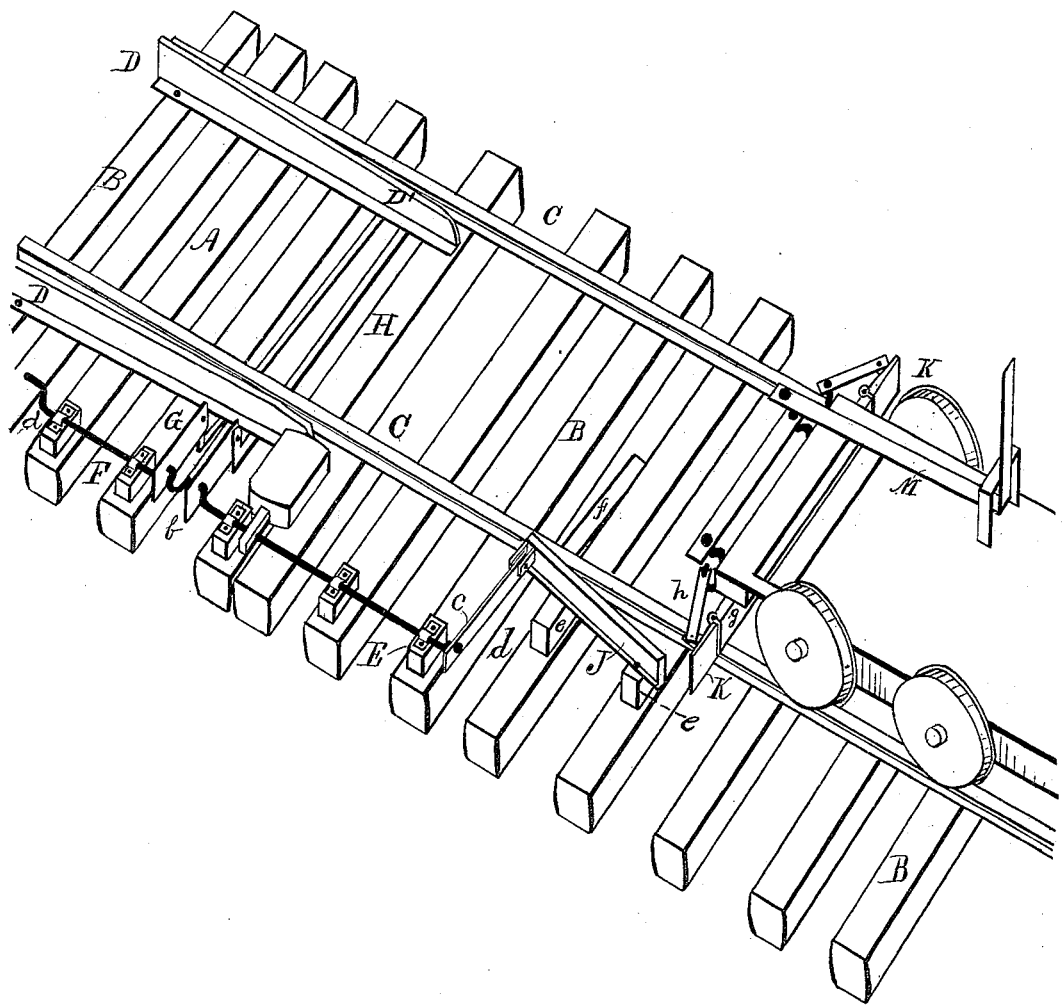
Figure 3:
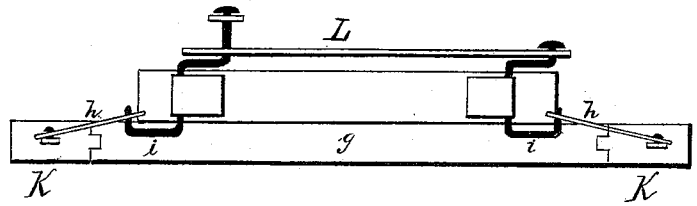
Figure 2:
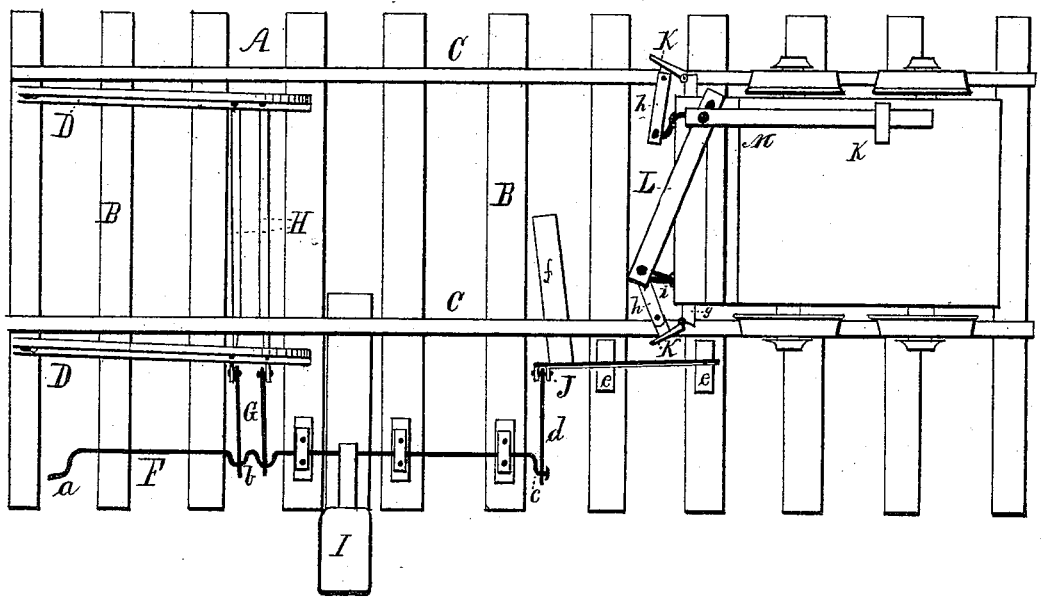

In the drawings, Figure 1 shows in perspective a portion of a railroad-track and a raised switch in switching position and switch-operating devices in readiness for pushing the switch clear of the main track, a part of said device being carried by the truck, as shown. Fig. 2 represents a plan view of the parts shown in Fig. 1, with the switch clear of the main track and the switch-operating devices in retracted position. Fig. 3 represents in front elevation a portion of my improvements as applied to the front of a locomotive or other truck and in operative position.

A represents the road-bed; B, the sleepers or cross-ties; C, the main line; and D, the switch-rails, which are beveled at their ends D', and extend above the tops of the main-line rails.

Pivoted on blocks E on the ties C adjacent to the switch is a rod, F, having at one end a crank or handle, *a*, by which it may be turned by hand when desired. Centrally of this rod are formed one or more crank-axles, *b*, to which are secured the outer ends of links G, to whose inner ends are connected transverse rods or levers H, which are connected to or near the inner ends of the switch-rails, so that on said rod F being turned inward said links will operate to push the rods or levers H and the thereto-attached switch-rails inward, and thus push the switch against the main line, while on turning said rod F outward, or away from the switch and main line, said switch will be opened and the main line cleared or opened.

A weighted bar, I, is mounted upon this rod F, in order that on said rod being turned in either direction such weighted bar will hold rod F firm and retain the switch in the desired position. On the opposite end of the rod F is a crank-wrist, *c*, which is connected by a link, *d*, with one end of bar or plate J, pivotally mounted upon blocks *e* on cross-ties, as shown. To the same end of this bar or plate J is attached a weighted bar or piece, *f*, whose office it is to steady and hold said plate J in the position it is caused to assume on being operated to turn the rod F, as hereinafter explained.

To the forward part of the locomotive or truck, in any desired or convenient position, or to a bar, *g*, secured thereto, I hinge or pivot one or more arms, K. To each of these arms I pivotally connect one end of a link, *h*, whose other end is connected by means of another link, *i*, to or near the end of a transverse rod or bar, L, which is pivoted to the frame of the locomotive, or to a bar or block connected therewith, so as to be capable of a rocking motion thereon.

M represents a lever, which is connected at one end to the bar L, its other end being extended upward, as shown, so as to be in convenient reach of the engineer upon the locomotive. This lever is held in proper position, with capability of the desired movement, by a staple, *k*, or any of the well-known means.

In operation, when an engineer traveling on the main line desires to continue on such main line and finds the switch open to the siding he will push the lever M forward. As the lever moves forward it will push that end of the bar L to which said lever M is attached outward and forward, and as said bar L moves forward it will turn the links *i* sidewise, and they in their turn will push the arms K into a horizontal position transverse of the locomotive, as shown in the drawings. Then, if a switch having my improvements attached thereto is adjusted to switch a train onto a siding, said arms K will strike the inwardly-extending end of the bar or plate J and force it outward, and as it moves outward and away from the line of rails it will force back the link *d*, which in its turn will turn the rod F and pull the switch away from the main line and allow the train to pass along said main line. If the engineer on approaching the switch finds that the main line is open to passage, there will be no necessity for his operating the device.

It is designed to provide each truck or locomotive with one of the arms K on each side, as shown in the drawings, to admit of an engineer operating switches of this construction on whichever side of the track the bar or plate J and parts connected therewith may be.

I do not broadly claim the operating of switches directly from the engine of a passing train, as I am aware of the patent granted to F. L. Bridges September 9, 1879, No. 219,383, and to others.

Having thus described my invention, what I claim therein is—

1. The crank-rod F, pivotally mounted on blocks on the cross-ties, and having links G d, rod or rods H for connecting said rod F to the switch-rails, and weighted bar I, the bar or plate J, pivotally mounted upon blocks e on the cross-ties, and having weighted bar or piece f, and the arms K, with suitable mechanism connected therewith and within reach of the engineer, in order that said arms may be readily forced into engagement with the bar or plate J, substantially as and for the purpose set forth.

2. The combination of lever M, pivotal bar L, links h i, hinged or pivoted arms K, pivoted bar or plate J, and crank-rod F, and suitable means for connecting said rod, plate, and the switch-rails together, substantially as and for the purpose described.

In testimony that I claim the foregoing as my own I have hereto affixed my signature in presence of two witnesses.

PHILIP LYON.

Witnesses:
CHAS. J. GOOCH,
GEO. F. GRAHAM.